United States Patent [19]

Dent

[11] Patent Number: 5,345,598
[45] Date of Patent: Sep. 6, 1994

[54] DUPLEX POWER CONTROL SYSTEM IN A COMMUNICATIONS NETWORK

[75] Inventor: Paul W. Dent, Stehag, Sweden

[73] Assignee: Ericsson-GE Mobile Communications Holding, Inc., Paramus, N.J.

[21] Appl. No.: 866,554

[22] Filed: Apr. 10, 1992

[51] Int. Cl.$^5$ .............................................. H04B 7/26
[52] U.S. Cl. .................................. 455/54.1; 455/67.1; 455/69; 455/127
[58] Field of Search ...................... 455/13.4, 52.1, 52.3, 455/53.1, 54.1, 67.1, 69, 70, 103, 127, 63, 56.1; 375/1

[56] References Cited

U.S. PATENT DOCUMENTS

| | | | |
|---|---|---|---|
| 4,134,071 | 1/1979 | Ohnsorge . | |
| 4,293,953 | 10/1981 | Gutleber | 375/25 |
| 4,470,138 | 9/1984 | Gutleber | 370/18 |
| 4,644,560 | 2/1987 | Torre et al. | 375/1 |
| 4,901,307 | 2/1990 | Gilhousen et al. | 370/18 |
| 4,930,140 | 5/1990 | Cripps et al. | 375/1 |
| 4,984,247 | 1/1991 | Kaufmann et al. | 375/1 |
| 5,022,049 | 6/1991 | Abrahamson et al. | 375/1 |
| 5,056,109 | 10/1991 | Gilhousen et al. | 375/1 |
| 5,101,501 | 3/1992 | Gilhousen et al. | 455/33.2 |
| 5,103,459 | 4/1992 | Gilhousen et al. | 375/1 |
| 5,109,390 | 4/1992 | Gilhousen et al. | 375/1 |

FOREIGN PATENT DOCUMENTS

| | | | |
|---|---|---|---|
| 0400314 | 4/1990 | European Pat. Off. . | |
| 3265314 | 11/1991 | Japan | 455/69 |
| 2229609 | 9/1990 | United Kingdom | 455/127 |

OTHER PUBLICATIONS

Derwent Abstract of Soviet Patent Application SU-A-1605254.

T. Masamura, "Spread Spectrum Multiple Access System with Intrasystem Interference Cancellation", *Trans. IEICE* vol. E 71, No. 3, pp. 224–231 (Mar. 1988).

M. Varanasi et al., "An Iterative Detector for Asynchronous Spread-Spectrum Multiple-Access Systems", *Proc. IEEE Global Telecommunications Conf. & Exhibition* p. 556–560, Hollywood, Fla. (Nov. 28–Dec. 1, 1988).

R. Kohno et al., "Adaptive Cancellation of Interference in Direct-Sequence Spread-Spectrum Multiple Access Systems", *Proc. IEEE/IEICE Global Telecommunications Conf.* vol. 1, pp. 16.8.1–16.8.5, Tokyo, Japan (Nov. 15–18, 1987).

A. J. Viterbi, "*Very Low Rate Convolutional Codes for Maximum Theoretical Performance of Spread-Spectrum Multiple-Access Channels,*" IEEE Journal of Selected Areas in Communications, vol. 8, No. 4, May 1990, pp. 641–649.

*Primary Examiner*—Reinhard J. Eisenzopf
*Assistant Examiner*—Chi Pham
*Attorney, Agent, or Firm*—Burns, Doane, Swecker & Mathis

[57] ABSTRACT

Measurements of mobile signal strength received at the base station are used to determine the portion of power that should be transmitted by the base station to a particular mobile. Each of a plurality of mobiles measure the relative strength of the base station signal specifically intended for that mobile. The relative strength is compared to either the total base station signal power or to a cumulative ranking of the power of signals intended for other mobiles. That comparison is used to determine whether the mobile should increase or decrease its power.

33 Claims, 5 Drawing Sheets

DUPLEX POWER CONTROL SYSTEM IN A COMMUNICATIONS NETWORK

FIELD OF THE INVENTION

The invention described here relates to radio communications systems, and in particular, to duplex power control systems for cellular radio telephone systems.

BACKGROUND OF THE INVENTION

A cellular radio telephone system divides a geographical area up into cells where neighboring cells are generally allocated different operating frequencies so as to avoid interference. Because of the relatively low power communication transmissions with a particular cell, another cell spaced two or more cells away may typically re-use the same frequencies. The further apart cells re-using similar frequencies are located, the lower the interference level between them. The frequency re-use/cell pattern is important in determining the desired signal-to-interference ratio (C/I) in a cell.

As the total number of different frequencies required to construct a cell pattern to achieve a desired C/I ratio increases, the number of frequencies available for use within a cell decreases. For example, if a total of 420 frequencies are available and a 21-cell pattern is required before frequency re-use is permitted, the number of frequencies that can be used in each cell is 420/21=20. Consequently, one way of increasing capacity is to use a transmission technique that operates at a reduced C/I.

Current cellular telephone systems prefer digitized voice transmission, as compared to the transmission of analog voice waveforms, because digitized transmission tolerates more interference. Thus, digitized voice transmission allows for a smaller frequency re-use pattern with a consequent increase in system capacity. When digital transmission techniques are used, error correction coding is often employed to increase interference tolerance. Unfortunately, error correction coding effectively widens the transmitted signal frequency bandwidth, reducing the number of available frequency channels. Extra interference tolerance permitting increased re-use of frequencies must be balanced with a reduction in the number of frequencies available.

The relationship between system capacity versus the amount of error coding is not monotonic and includes several maxima and minima as the amount of error coding increases. At one extreme, the amount of error coding is so great that interference levels equal to or in excess of the power level of the desired signal can be tolerated. In that situation, overlap between signals is permissible, and the system is known as a Code Division Multiple Access (CDMA) system.

In CDMA systems with many overlapping, interfering signals, a factor of two increase in system capacity may be achieved by temporarily turning off subscriber transmitters during the moments of silence during a two-party conversation. It has been well documented that 50% or more of the time during a call connection between two subscribers is actually silence. Consequently, the number of conversations may be doubled before interference becomes problematic. A Discontinuous Transmission (DTX) takes advantage of this feature and is employed in conventional cellular access systems, such as the Time Division Multiple Access (TDMA), Pan-European Digital Cellular System known as GSM. DTX effectively reduces the prevailing interference of all the signals with respect to each signal.

Another technique for reducing interference between signals in neighboring cells on the same frequency is to configure the transmission power distribution of a cell over all of the mobiles within a cell according to each mobile's distance from its respective cell edge. The power transmitted downlink from a base station in the center of the cell to a mobile on the cell edge should be the greatest. In other mobile locations further from the cell edge and closer to the base station, the power level should follow a fourth power radius law based on the distance or radius of the mobile from the cell center where typically the base station is located. In the uplink direction from mobile to base station, the mobile's transmission power should also be set according to a fourth power radius law, in order to equalize the signal strengths received at the base station and to prevent those mobiles closest to the base station from using unnecessary power levels that would cause substantial interference.

Unfortunately, there is no direct technique for either the base station or the mobile to determine the distance between themselves. Consequently, the radius necessary to construct a fourth power law is unknown. This problem is overcome in conventional systems using a technique known as Dynamic Power Control in which a command is transmitted from the base station to the mobile to reduce its power if the signal strength received by the base station from that mobile is unnecessarily high. Similarly, the mobile sends a message to the base station including a measurement of the signal strength received from the base station. The base station uses that measurement to regulate its transmitted power to that mobile. The Dynamic Power Control technique has the disadvantage that it is slow to react because of the cumbersome, bi-directional messages needed between the base station and the mobile. The bi-directional signalling also reduces the capacity or quality of the traffic channel.

It would be desirable to have a cellular power control system that has increased system capacity in terms of frequency reuse but that minimizes the effects of any increased interference. Moreover, it would be desirable to achieve these goals by regulating efficiently and accurately the power transmitted from the base station to a mobile and the power transmitted from each mobile to its base station without the need for bidirectional power control messages between the base station and the mobiles.

SUMMARY OF THE INVENTION

In the present invention, a single control loop regulates the power transmitted by the base station to its associated mobiles and the power transmitted by those mobiles to the base station. The base station monitors each mobile transmitter's power by measuring the signal strength of signals received from each mobile. If a mobile's power level has increased or decreased, the base station adjusts that fraction of its total transmitter power that is apportioned to transmissions to that mobile to compensate for the power level change. In turn, the mobile detects that adjusted power level and increases (or decreases) its transmission power in accordance with the detected power.

Each mobile measures the signal strength of that portion of the total base station signal specifically intended for that mobile, and compares that signal strength value to either the total base station signal power or in a relative manner to a cumulative ranking of base station signal strengths intended for other mobiles. From that comparison, the mobile increases or decreases its transmission power. Each mobile's comparison of relative signal strength of received signals from the base station to the signal strength comparison of signals received by other mobiles from the same base station eliminates the affect of multi-path fading on the base-mobile signal path because all of the signals fade more or less equally. As a result, fading in the downlink direction from base station to mobile does not cause undue variations in how the mobile determines its transmitter power.

The present invention essentially accomplishes duplex power regulation for both uplink and downlink communications simultaneously using only one control loop. This control loop is more efficient than the prior art techniques requiring exchange of power control data messages between the mobiles and base station, and it also compensates for multipath fading affects not accounted for in the prior art systems.

BRIEF DESCRIPTION OF THE DRAWINGS

These and other features and advantages of the invention will be readily apparent to one of ordinary skill in the art from the following written description, read in conjunction with the drawings, in which.

DETAILED DESCRIPTION OF THE PREFERRED EMBODIMENTS

The invention applies to radio communications systems between base stations and a multiplicity of mobiles where the power levels transmitted by each mobile and by the base station may be controlled to provide optimal signal power levels in order to reduce interference in surrounding cells. For purposes of description only, the present invention is described in the context of discrete and continuous transmissions from mobile to base and base to mobile.

Figure 1:
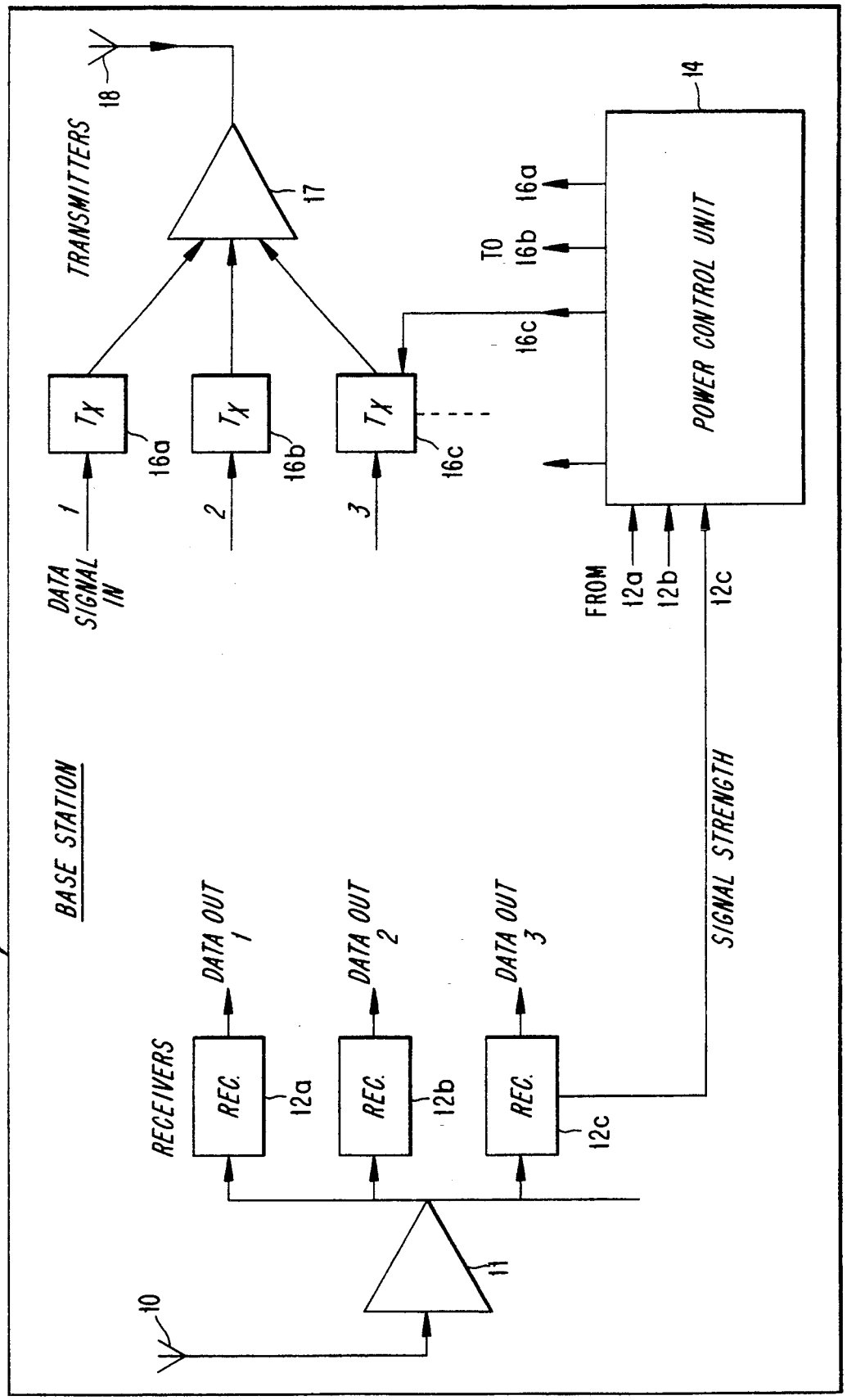
FIG. 1 is a functional block diagram of a base station according to the present invention.

According to FIG. 1, a base station 100 is equipped with transmitters (16a, 16b, 16c . . . ) for transmitting different data signals to a plurality of mobile stations via a transmitter amplifier 17 and an antenna 18. The relative power level of each transmitted signal is determined by a power control unit 14. As will be described in more detail below, the power control unit 14 determines and sets the power levels for signal transmissions apportioned to each mobile based on the relative power levels measured by the receivers 11, 12a, 12b, 12c . . . of the signals received from each respective mobile station via an antenna 10. The sum of all of the signals transmitted by the base station 100 combine to define a composite signal.

Figure 2:
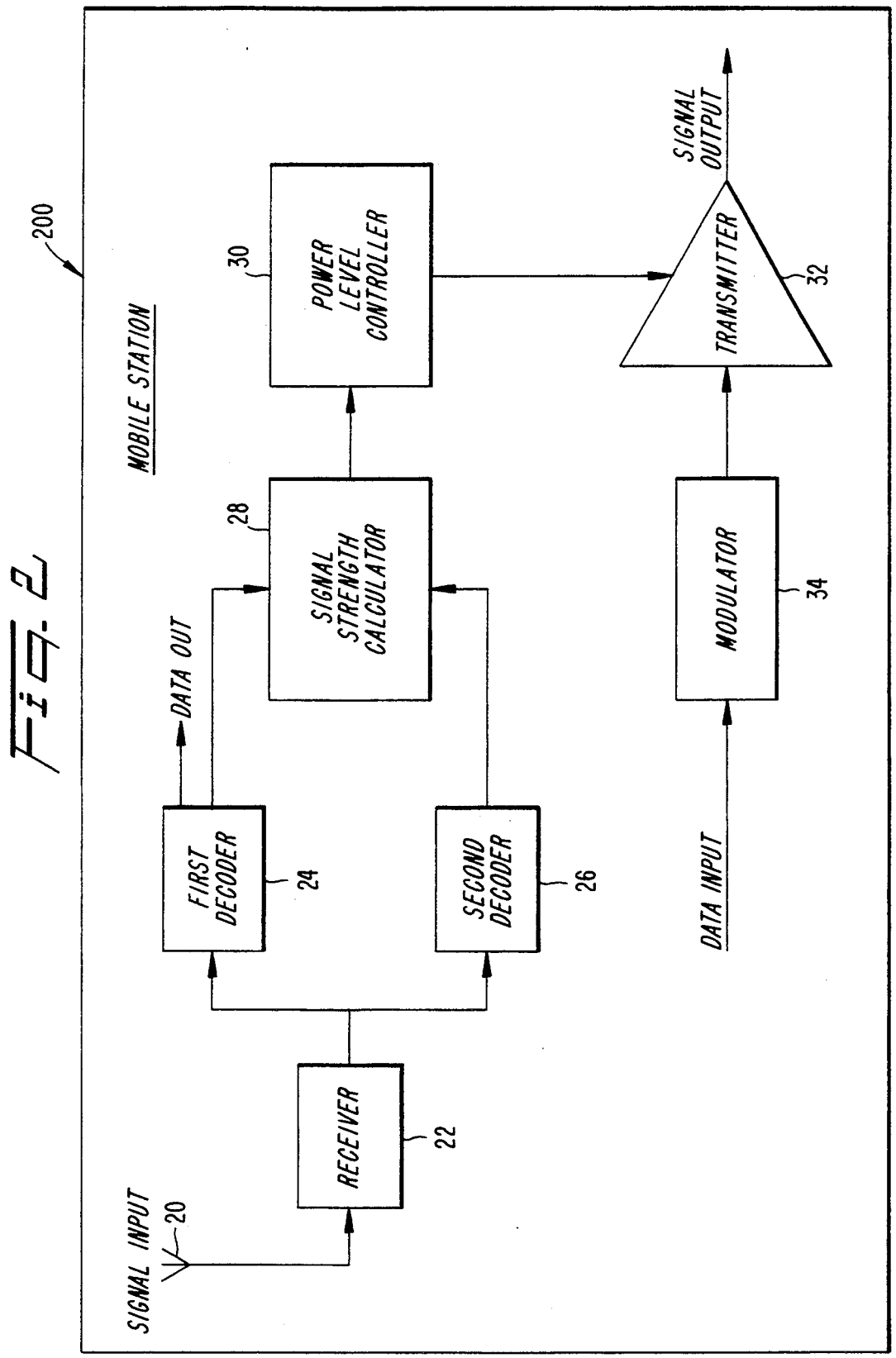
FIG. 2 is a functional block diagram of a mobile station according to the present invention.

According to FIG. 2, a mobile station 200 is equipped with a receiver 22 which operates in a conventional manner to filter, amplify and demodulate a signal from antenna 20. A first decoder 24 is provided for selectively receiving and decoding its intended signal transmitted from the base station 100 and measuring its signal strength. Data signals demodulated in the first decoder 24 are generated as output data signals for subsequent use. Other signals transmitted from the base station 100 intended for other mobiles within its cell are received and decoded in a second decoder 26 where their respective signal strengths are measured. A signal strength calculator 28 receives the signal strength measurements from both of the first and second decoders 24 and 26 and calculates a transmission power for the mobile 200 to use in transmissions to the base station 100. The data input signals to be transmitted from the mobile 200 to the base station 100 are received in a modulator 34. A transmitter 32 receives the modulated signal. Based on the transmission power calculated by the signal strength calculator 28, a power level controller 30 varies the power of the transmitter 32 to transmit a mobile output signal.

The operation of the control loop of the present invention will now be described. If the power control unit 14 of the base station 100 determines that a particular mobile's signal strength is greater (or weaker) than signal strengths received from the other mobiles, the base station 100 power control unit 14 reduces the power of a corresponding transmitter, e.g., transmitter 16a. That power reduction is implemented not as an instantaneous change but rather as a gradual change from the present power value towards the new target value over a period of time, e.g., 20 msec.

After the mobile 200 measures the received signal strength in the first decoder 24, the signal strength calculator 28 determines that the strength of the signal from the base station 100 to the mobile 200 has been reduced relative to the signal strength previously received. The actual power reduction is determined either by computing the ratio of the signal strength value received by the mobile decoder 24 to the mean of the total signal power transmitted to all of the mobiles in the cell, or by determining the position of the signal received by the mobile 200 in a relative signal strength ranking with signals for other mobiles within the cell.

For example, if the mobile's 200 received signal strength had previously been ranked fifth in a signal strength order of all the cell mobiles and is now determined to be sixth, it is clear that the apportioned signal power from the base station to that mobile 200 has been reduced. Thus, the mobile power level controller 30 changes the target power level for the mobile transmitter 32 from a power value P5 to a lower power target value P6. These power values P1, P2, P3 . . . may be stored in a memory in a predetermined table format. The power level controller 30 then decreases the actual value of the transmitted mobile power over a predetermined time period from P5 towards P6. If at the end of that time period, the transmitted mobile power has only reached some intermediate value Pi and new signal strength measurements result in a new target value Pn, then the power level is gradually changed from the current value Pi towards the target value Pn.

Alternatively, if actual signal strength rather than relative signal strength order is used to determine power level changes, the mobile power level controller calculates a ratio r=So/Sm, where So denotes the signal strength of that portion of the base station signal intended for a specific mobile 200 and Sm denotes the mean signal strength value of the base station signals intended for other mobiles. From this ratio a new target power level is selected according to a non-linear function P(r) which depends on the ratio r. The exact nature of the non-linear function P(r) depends on the particular communications scenario such as the number of mobile stations supported by each cell, the type of modulation, the frequency re-use pattern, the distribution of mobiles in the cell, the physical geography within the cell, the desired C/I ratio, etc., and may be specified by a predetermined look-up table.

Thus, the control loop essentially includes the base station detecting power level changes from individual mobiles in its cell as those mobiles move further or closer, behind buildings, etc., and adjusting the power level of the base station transmitter associated with each mobile to minimize the affect of those power level changes. Once a mobile detects that change in base station transmission power level allocated to that mobile, it modifies its transmission power level to match the detected change. No bidirectional messages or signalling between the base station and mobiles is required.

A preferred embodiment of the present invention for a duplex power control system is described for purposes of illustration in the context of a subtractive CDMA cellular telephone system similar to that disclosed in U.S. patent application Ser. No. 07/628,359, filed on Dec. 17, 1990, assigned to the present assignee. The subject matter of this application is expressly incorporated by reference.

Figure 3:
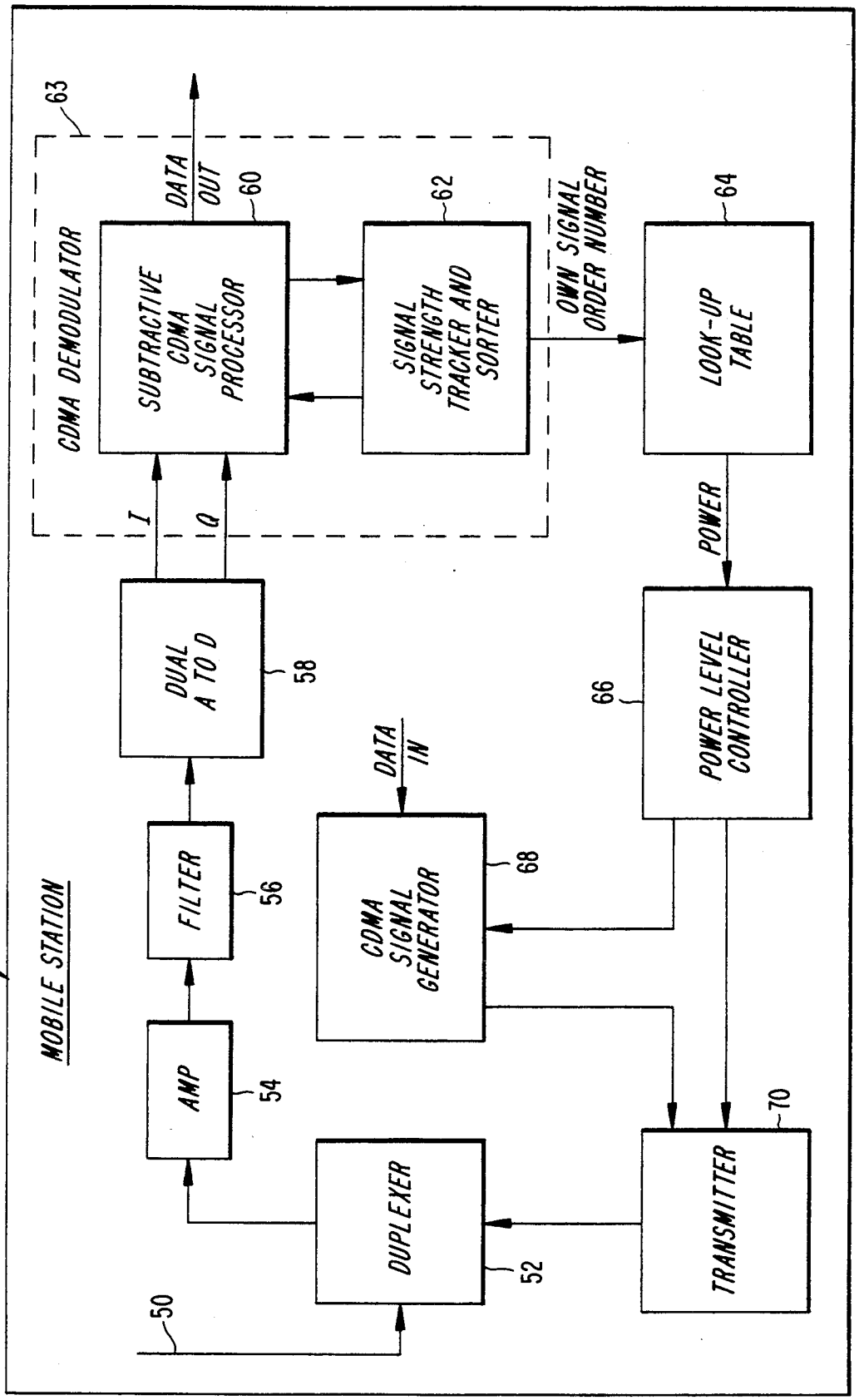
FIG. 3 is a detailed functional block diagram of a mobile station for implementing the present invention in a CDMA cellular system.

A mobile station 200 for implementing this preferred embodiment is illustrated in FIG. 3. A duplexer 52 allows both a receiving amplifier 54 and a transmitter 70 to be connected to an antenna 50 simultaneously. The amplifier 54 amplifies a received, composite signal which includes signals from the base station to all of the mobile stations within its cell as well as interference. A filter 56 filters the amplifier output signal to remove extraneous noise. The filter 56 output signal, consisting of a coded block of superimposed CDMA signals from the corresponding base station 100, is divided into its real and imaginary (quadrature or I,Q) components and digitized in a dual-channel A-to-D convertor 58.

A CDMA signal processor 60 and a signal strength tracker and sorter 62 form a CDMA demodulator 63. The CDMA processor 60 demodulates the strongest signal from the composite signal and subtracts the demodulated signal from the composite received signal in an iterative demodulation process until all of the coded, mobile signals from the base station 100 are demodulated. The signal strength values of each demodulated signal code block are sorted in the signal strength tracker and sorter 62 in the order of strongest to weakest signal strength value and used to predict the relative strengths of the signals for the next code block. A detailed description of the subtractive CDMA demodulation procedure is provided in the above-described patent application which has been incorporated by reference.

The position in signal strength order of that portion of the base station signal intended for a particular mobile is assigned a relative power level value by the signal strength tracker and sorter 62 and stored in a memory look-up table 64. The signal strength tracker and sorter 62 assigns power levels according to the relative signal strength order. A higher relative signal strength would correspond, for example, to a greater power level value and vice versa.

Each power level in the relative power level order is associated with a particular mobile and each mobile's power level is sent to its respective power controller 66. If the power level associated with that particular mobile has changed since the last iteration, the power controller 66 regulates that mobile transmitter's 70 output power towards the new power level value. The power controller 66 imposes a time constant on the change from the present power to the newly determined power level so that the base station 100 does not experience sudden step changes in the received power level from that mobile. For example, the power controller 66 might ramp the power level from the present value to the desired value at a limited rate so that it does not change more than 0.10 decibels between successive code blocks. If a code block has a typical duration of 0.50 msec, the rate of power change may be 200 dB per second. This rate is sufficiently high to partially minimize the effects of signal fading.

In an alternative embodiment, rather than using a mobile's position in signal strength order to select the transmitter power in discrete steps, the ratio "r" of the power of that portion of the base station signal So intended for one mobile divided by the total power of all the mobile signals within the cell Sm is used as a continuous power control variable. This continuous variable is transformed through the non-linear function P(r) to obtain the new, desired value of the mobile transmitter power. The non-linear function P(r) may be implemented by numerically approximating the continuous variable "r" to a certain number of bits, e.g., 8 bits, and using it to address a look-up table, e.g., having 256 locations. The look-up table representing P(r) is predetermined so that for each of 256 "r" values, a corresponding value P(r) is addressed and retrieved. Greater precision is achieved by increasing the number of bits representing the ratio "r" e g , 10 bits generates 1024 values stored in the lookup table. Of course, if "r" was truly continuous, a lookup table would be infinitely large.

It is beyond the scope of this description to provide exhaustive details concerning the determination of the non-linear function used to generate the contents of the look-up table. Such a determination requires complex simulations of the entire duplex communications system. However, the various criteria set forth below will enable a person of ordinary skill in the art to develop a suitable, non-linear function. The ratio "r" may be expressed either as a power ratio, a voltage ratio, or in dB's, i.e., on a logarithmic scale. A simulation of a non-linear function P(r) for achieving an optimum relationship between uplink and downlink relative power is illustrated graphically in FIG. 5. The cell is assumed to contain 24 active mobiles numbered 1–24 along the horizontal axis in increasing distance from the base station. X=24 corresponds to the mobile farthest from the base station; X=1 corresponds to the mobiles nearest the base station.

While the power levels required in the uplink direction from mobile to base station to provide equal power levels at the base station are determined by the fourth power propagation law described above, e.g., the power levels are inversely proportional to the fourth power of the distances from each mobile to its base station, the propagation law which dictates the power levels required for the downlink direction to provide equal signal quality at each mobile must account for neighboring cell interference. It is the difference between the uplink and downlink propagation laws caused by neighboring cell interference that requires a non-linear function to translate relative signal strength for downlink transmissions to required transmitter power on uplink transmissions.

Figure 5:
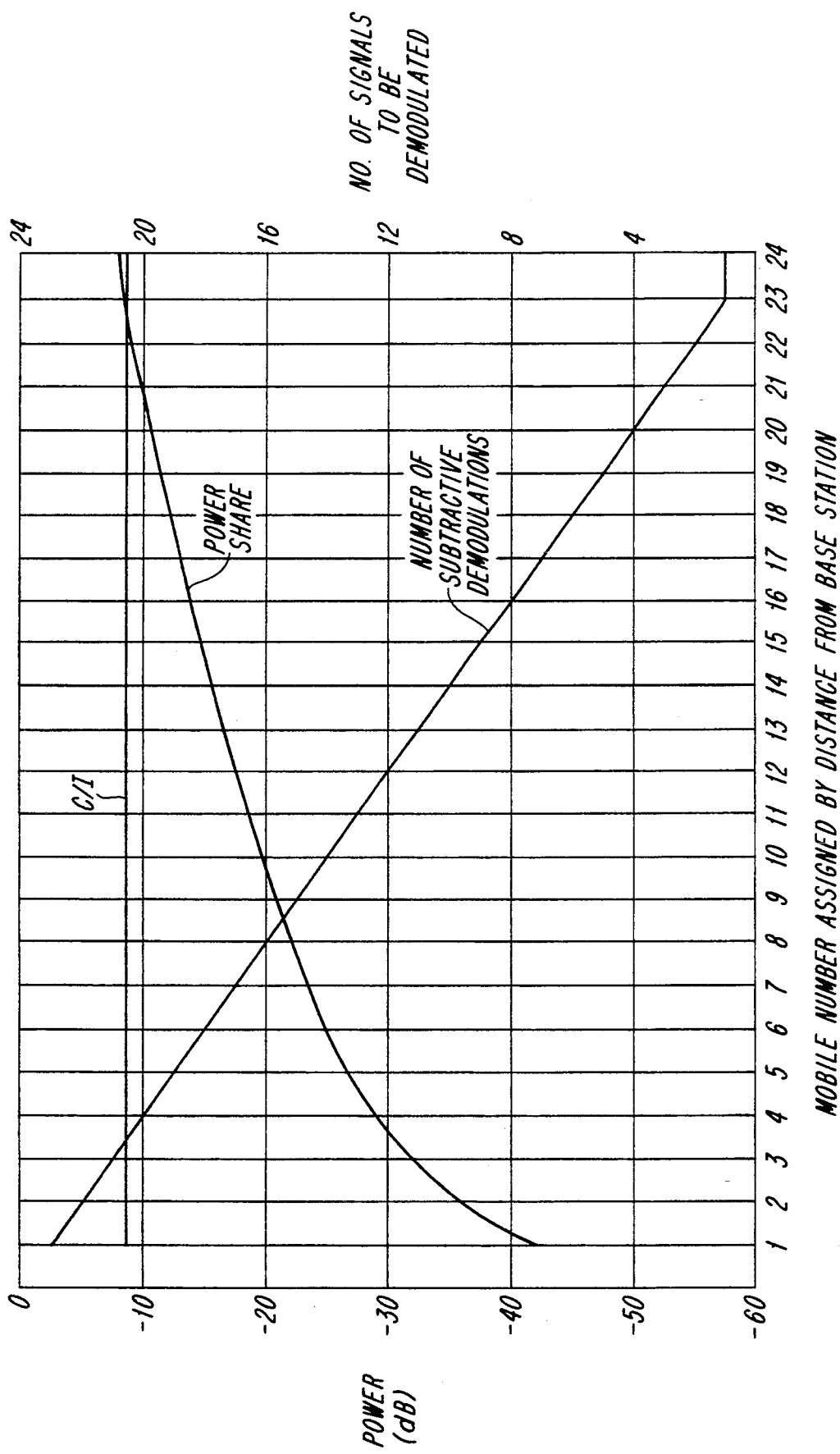
FIG. 5 is a graphic simulation of a non-linear power control function that may be used to achieve an optimum relationship between uplink and downlink relative power.

The graph in FIG. 5 illustrates the non-linear correspondence between distribution of base station power to mobiles on the downlink and mobile transmitter power required uplink to the base station. The curve labelled Power Share shows for the particular system simulated the proportion of the total base station transmitter power each mobile should receive (in dB below total transmitted base station power) to achieve equality in signal quality at each mobile. Consequently, mobile 1 receives $-42$ dB of the total power while mobile 24 receives $-8$ dB, a difference of 34 dB. On the other hand, mobile 24 is $\sqrt{24}$ further times away than mobile 1, assuming a uniform area distribution of mobiles, and based on the fourth power radius law referenced above, the mobile 24 needs to transmit $(24)^2$ times as much power as mobile 1 which is equivalent to 28 dB. Likewise mobile 10 gets 22 dB more base station power than mobile 1 but should transmit 20 dB more back to the base station, etc. Thus, each mobile adjusts its transmitter power in response to changes of signal strength intended for that mobile received from the base station according to the non-linear function P(r).

Another objective of the present invention in adjusting mobile transmitter power is to achieve equal signal-to-interference ratios (C/I) at the base station for all the mobiles simultaneously with equal signal-to-interference ratios (C/I) at all of the mobiles with respect to signals from the base station. A problem affecting achievement of that objective is that the instantaneous signal strengths of all mobiles varies because of multipath or Rayleigh fading on their respective, uncorrelated signal paths. In systems using subtractive CDMA demodulation, signals from mobiles near the base station exhibiting a single, dominant propagation path (low echoes) have the strongest signal strengths and therefore should be demodulated and removed from the composite signal first. Signals from more distant mobiles being more likely to be received with multiple paths (delayed echoes from reflections from mountains, buildings, etc.) should be removed subsequently. Accordingly, in the subtractive CDMA embodiment of the present invention, the base station sets one target signal strength above the mean for mobiles likely to have multiple paths and a second target signal strength below the mean for those mobiles less likely to have multiple paths.

Given the unpredictable nature of the interference and multipath fading problems described above, the contents of the non-linear power function look-up table 64, being based on theoretical calculations, must often be modified in light of practical experience for optimal results. The present invention provides for the look-up table 64 to be changed by a command from the base station included in the data received by the mobile as a digital control message. While the modification might be an overall scaling factor in the simplest case, it might also involve the selective modification of certain elements or a complete rewriting of the entire table. In situations where target signal strengths are not specified by the base station or are unnecessary, a default table look-up may also be provided in each mobile station.

When discontinuous transmission (DTX) is used in conjunction with the duplex power control system of the present invention, normally only the mobile transmitter associated with the active speaker is transmitting. Therefore, during much of a normal voice conversation a communications link exists only in one direction, and the power control loop of the present invention between the mobile and the base station is broken. Of course, it is possible for a mobile to formulate its transmitter power based on past signal strength measurements from previous transmissions from the base station, but those measurements may be too old to be of use and no compensation for Rayleigh or log normal fading is obtained.

Figure 4:
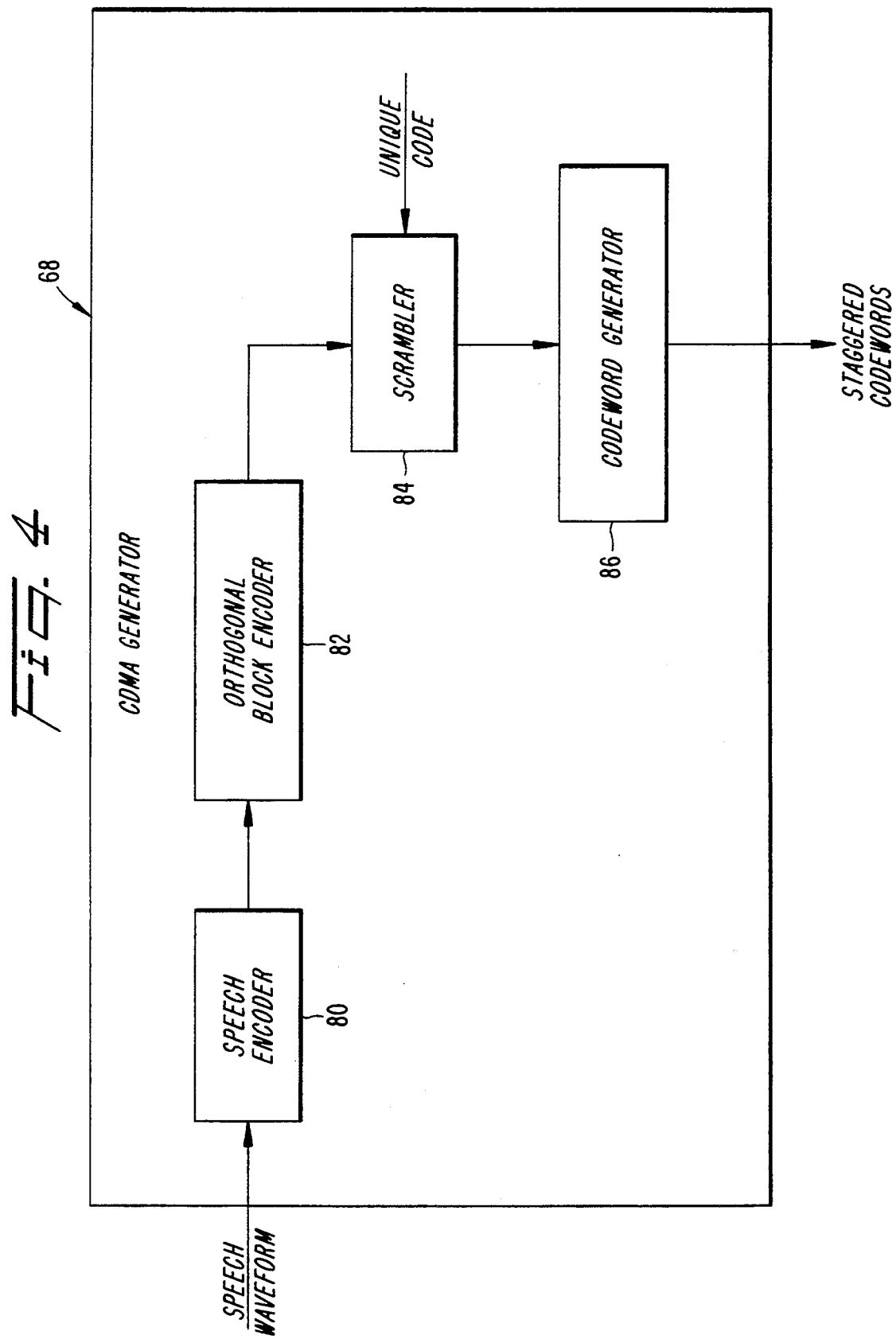
FIG. 4 is a functional block diagram of a CDMA signal generator for implementing the present invention.

The use of DTX in combination with the present invention in the system illustrated in FIG. 3 will now be described in more detail in conjunction with FIG. 4. The CDMA signal generator 68, which is used either in the base station 100 or each mobile 200, uses a speech encoder 80 for encoding the speech input waveform in typically 20 msec blocks into a coded block of typically 280 data bits. Each 20 msec block generated by the speech encoder 80 either contains speech information or silence (no speech). An orthogonal block encoder 82 encodes groups of bits, typically seven bits, of the coded block into code words, typically 128 bits long. A scrambler 84 using a unique code for each mobile insures that code word sequences differ for each mobile.

Of forty-two code words transmitted per 20 msec, forty code words typically represent one speech block. The code words in each block are staggered by a code word generator 86 one code word apart in order to distinguish between the signals destined for different mobiles. The benefit of staggering is that the staggered code words appear for each mobile signal at different time positions and maintain signal strength measurements between each mobile and the base station during otherwise silent transmission periods. Also, peaks in receiver activity to demodulate and decode the code words are avoided.

At times when there is no speech to transmit because of a silent period, only two (or some small number) code words in a predetermined position within the 40-word block are transmitted. When the base station or mobile receiver detects these initial code words indicating a silence block, the receiver ignores the rest of the block. In this way, considerable signal processing resources are conserved. In addition, this staggered code word transmission technique provides the mobile and base station receiver with at least one sample of signal strength for each signal every 20 msec, thus enabling the power control loop of the present invention to remain in continuous operation.

The invention has been described in terms of specific embodiments to facilitate understanding. The above embodiments, however, are illustrative rather than limitative. It will be readily apparent to one of ordinary skill in the art that departures may be made from the specific embodiments shown above without departing from the essential spirit and scope of the invention. Therefore, the invention should not be regarded as limited to the above examples, but should be regarded instead as being fully commensurate in scope with the following claims.

What is claimed is:

1. In a communications system including at least one base station and a plurality of mobiles for communicating with said at least one base station, a power regulation system, comprising:

each mobile including:
mobile receiving means for receiving a composite signal formed from signals transmitted from said base station to all of said plurality of mobiles, each transmitted signal intended for one of said mobiles, and for determining corresponding signal strength values for each received signal in said composite signal and,
means, connected to said mobile receiving means, for computing from said signal strength values a desired mobile transmitter power level, and said base station including:
base station receiving means for receiving signals transmitted from said plurality of mobiles and for measuring their corresponding signal strength values, and
means for modifying power levels of signal transmissions to said mobiles based on said measured signal strength values so that each of said mobile receiving means receives its intended signal with substantially equal signal quality and said base station receiving means receives said mobile transmitted signals with substantially equal signal quality.

2. A system as described in claim 1, wherein said computing means computes said desired power level for each mobile transmitter form a relative ranking of said determined signal strength values from greatest to weakest signal strength.

3. The system according to claim 2, wherein said computing means includes:
means for detecting changes in a power level of transmissions intended for said mobile based on changes in said relative ranking;
means for increasing said mobile's transmitter power level when said relative ranking increases; and
means for decreasing said mobile's transmitter power level when said mobile's relative ranking decreases.

4. A system as described in claim 1, wherein said computing means computes said desired power level for its respective mobile as a function of a ratio of said determined signal strength value associated with said respective mobile to a mean of said determined signal strength values associated with other mobiles.

5. A system according to claim 4, wherein said computing means includes:
means for detecting changes in power levels of transmitted signal intended for said mobile based on changes in said ration;
means for increasing said mobile's transmitter power level when said ratio increases; and
means for decreasing said mobile's transmitter power level when said ratio decreases.

6. A system according to claim 1, wherein said computing means includes:
means for storing in table form a non-linear power distribution function, and
means for determining said desired power level based on said non-linear power distribution function.

7. A system according to claim 6, wherein said base station includes means for generating and transmitting a modification command; and
wherein each mobile further includes mean, responsive to said modification command, for altering said storing means to adapt to said non-linear function.

8. A system according to claim 1, each mobile further comprising:
transmission means for transmitting a mobile signal from said mobile, and
means, connected to said computing means, for gradually altering power of said transmission means based on said computed desired mobile transmitter power level.

9. A system according to claim 1, wherein said modifying means increases power levels of signal transmissions to mobiles having relatively lesser measured signal strength values and decreases power levels to mobiles having relatively greater measured signal strength values.

10. A system as in claim 1, wherein said computing means includes:
means for sorting said determined signal strength values in an order from greatest to lowest signal strength value, and
means for selecting said desired mobile transmitter power level from a predetermined look-up table stored in a memory based on the position of said mobile's determined signal strength value in said sorted order.

11. A system as in claim 1, wherein said mobile and base station receiving means each include a Code Division Multiple Access receiver.

12. A system as described in claim 1, wherein said mobile receiving means is a code division multiple access demodulator (CDMA) including:
subtractive CDMA demodulation means for demodulating said composite signal into a plurality of demodulated signals corresponding to said transmitted signals to each of said plurality of mobiles;

13. The system according to claim 12, wherein said ranking means includes a memory for storing said demodulated signal strengths in table format.

14. The system according to claim 12, each mobile further comprising:
CDMA signal generating means, connected to said computing means, for generating coded blocks of CDMA data signals and for staggering in time transmission of said coded blocks.

15. The power control system according to claim 1, wherein each mobile includes:
means for detecting periods of silence in communications from said base station to any mobile, and
means for deactivating demodulation of a signal detected to be silent.

16. In a communications system including at least one base station and a plurality of mobiles for communicating with said at least one base station, a power control system, comprising:
each mobile having a transmitter; and
said base station having means for altering base transmitter power transmitted to each mobile to produce, for each mobile, a corresponding base station transmitter power that is a desired proportion of total base transmitter power and thereby to instruct each mobile to regulate its mobile transmitter power,
wherein an increase in said corresponding base station transmitter power in proportion to total base transmitter power indicates to a corresponding mobile that said corresponding mobile is to increase its mobile transmitter power.

17. In a communications system including at least one base station and a plurality of mobiles for communicating with said at least one base station, a power control system, comprising:

each mobile having a transmitter; and said base station having means for altering base transmitter power transmitted to each mobile to produce, for each mobile, a corresponding base station transmitter power that is a desired proportion of total base transmitter power and thereby to instruct each mobile to regulate its mobile transmitter power, wherein said altering means includes means for determining, for each mobile, said desired proportion that will equalize signal power levels received at said base station from each of said mobile.

18. In a communications system including at least one base station and a plurality of mobiles for communicating with said at least one base station, a power control system, comprising:

each mobile having a transmitter; and said base station having means for altering base transmitter power transmitted to each mobile to produce, for each mobile, a corresponding base station transmitter power that is a desired proportion of total base transmitter power and thereby to instruct each mobile to regulate its mobile transmitter power, wherein each mobile further comprises:

means for detecting alterations in received signal strength of a corresponding signal transmitted to said mobile in proportion to total signal strength of all signals received from said base station, and means for changing said mobile transmitter power based on said detected alternations.

19. The power control system as in claim 18, wherein said changing means changes said mobile transmitter power as a function of a ratio of a strength value of a signal intended for said mobile to a mean of strength values of signals intended for other of said mobiles.

20. The power control system as in claim 18, wherein said detecting means includes means for ranking from greatest to least signal strength values to all signals transmitted to said mobiles and wherein said changing means increases said mobile transmitter power if its relative ranking increases and decreases said mobile transmitter power if its relative ranking decreases.

21. A system according to claim 18, said changing means including:

means for storing in table form a non-linear power distribution function, and means for determining said changed mobile transmitter power based on said non-linear function.

22. A system according to claim 21, wherein said base station includes means for generating and transmitting a modification command, and wherein each mobile further includes means for modifying said storing means in each mobile to adapt said non-linear function.

23. In a communications system including at least one base station and a plurality of mobiles for communicating with said at least one base station, a power control system, comprising:

each mobile having a transmitter; and said base station having means for altering base transmitter power transmitted to each mobile to produce, for each mobile, a corresponding base station transmitter power that is a desired proportion of total base transmitter power and thereby to instruct each mobile to regulate its mobile transmitter power, wherein each mobile includes:

a receiver;

means, coupled to said receiver, for detecting periods of silence in communications from said base station to any mobile; and means, coupled to said detecting means and to aid receiver, for deactivating processing by said receiver of any signal detected to be silent.

24. In a communications system including at least one base station and a plurality of mobiles for communicating with said at least one base station, a power control system, comprising:

each mobile having a transmitter; and said base station having means for altering base transmitter power transmitted to each mobile to produce, for each mobile, a corresponding base station transmitter power that is a desired proportion of total base transmitter power and thereby to instruct each mobile to regulate its mobile transmitter power, wherein the system further comprises:

means for achieving approximately the same signal-to-interference ratios at said base station for all of said mobiles, and means for regulating the power of signal transmissions from said base station to achieve approximately the same signal-to-interference ratio at each mobile from said base station.

25. In a communications system including at least one base station an a plurality of mobiles for communicating with said at least one base station, a power control system comprising:

means for regulating the power levels of signal transmissions from said base station to achieve approximately the same signal-to-interference ratios at each mobile from said base station, and means responsive to the power levels of signal transmissions from said base station for adjusting the power level of signals transmitted from said mobiles to said base station to achieve approximately the same signal-to-interference ratios at said base station for all of said mobiles, wherein said adjusting means increases the power level of signals transmitted from said mobiles to said base station in response to an increase in power level of signal transmissions from said base station.

26. In a communications system including at least one base station and a plurality of mobiles for communicating with said at least one base station, a power control system comprising:

means for regulating the power levels of signal transmissions from said base station to achieve approximately the same signal-to-interference ratios at each mobile from said base station, and means responsive to the power levels of signal transmissions from said base station for adjusting the power level of signals transmitted from said mobiles to said base station to achieve approximately the same signal-to-interference ratios at said base station for all of said mobiles, wherein each mobile includes:

a receiver;

means for detecting periods of silence in communications from said base station to any mobile; and means for deactivating processing by said mobile receiver of any signal detected to be silent.

27. In a communications system including at least one base station and a plurality of mobiles for communicating with said at least one base station, a power control system comprising:
  means for regulating the power levels of signal transmissions from said base station to achieve approximately the same signal-to-interference ratios at each mobile from said base station, and
  means responsive to the power levels of signal transmissions from said base station for adjusting the power level of signals transmitted from said mobiles to said base station to achieve approximately the same signal-to-interference ratios at said base station for all of said mobiles,
  wherein each mobile further comprises:
    means for detecting signal strengths of signals transmitted from said base station intended for each mobile; and
    means, coupled to said signal strength detecting means, for ranking said detected signal strengths in order to relative signal strength from greatest to weakest signal strength, wherein said adjusting means adjusts the power level of signal transmissions from each mobile based on said relative signal strength ranking.

28. A system according to claim 27, each mobile further comprising:
  transmission means for transmitting a mobile signal from said mobile, wherein said adjusting means, connected to said ranking means, gradually adjusts power of each mobile's transmitter based on said relative ranking.

29. A system according to claim 27, wherein said adjusting means increases the power level of signal transmissions from mobiles that determine its respective signal strength received from the base station to have increased, and decreases the power level of signal transmissions from mobiles that determine its respective signal strength received from said base station to have decreased.

30. A system as in claim 27, wherein said ranking means includes:
  mean for sorting values of said detected signal strengths in an order from greatest to lowest, and
  means for selecting mobile transmission power levels from a predetermined look-up table stored in a memory based on a position of a mobile's signal strength value in said sorted order.

31. In a communications system including at least one base station and a plurality of mobiles for communicating with said at least one base station, a power control system comprising:
  means for regulating the power levels of signal transmissions from said base station to achieve approximately the same signal-to-interference ratios at each mobile from said base station, and
  means responsive to the power levels of signal transmissions from said base station for adjusting the power level of signals transmitted from said mobiles to said base station to achieve approximately the same signal-to-interference ratios at said base station for all of said mobiles
  wherein said regulating means includes means for computing a power level for each mobile as a function of a ratio of each mobile's signal strength value to a mean of other mobile's signal strength values.

32. In a communications system including at least one base station and a plurality of mobiles for communicating with said at least one base station, a power control system comprising:
  means for regulating the power levels of signal transmissions from said base station to achieve approximately the same signal-to-interference ratios at each mobile from said base station, and
  means responsive to the power levels of signal transmissions from said base station for adjusting the power level of signals transmitted from said mobiles to said base station to achieve approximately the same signal-to-interference ratios at said base station for all of said mobiles,
  wherein each mobile includes:
  means for storing in table form a non-linear power distribution function, and
  means for determining a mobile transmitter power based on said non-linear function.

33. A system as described in claim 32, wherein said base station includes means for generating and transmitting a modification command; and
  wherein each mobile includes means, responsive to said modification command, for modifying said storing means in each mobile to adapt said non-linear function.

* * * * *